United States Patent

[11] 3,552,422

| [72] | Inventors | Fredrick E. Michelson<br>95 Walnut St., Walpole, 02081;<br>Leslie A. Runton, 8 Elm St., Canton, Mass. 02021 |
|---|---|---|
| [21] | Appl. No. | 757,427 |
| [22] | Filed | Sept. 4, 1968 |
| [45] | Patented | Jan. 5, 1971 |

[54] VALVE SYSTEM
9 Claims, 1 Drawing Fig.

[52] U.S. Cl. ............................................. 137/329.1,
137/614.21, 251/61.4, 251/62
[51] Int. Cl. .......................................................... F16k 43/00
[50] Field of Search .......................................... 137/100,
101, 315, 316, 329.1, 614, 614.19, 614.21;
251/61, 61.1, 61.2, 61.4, 61.5, 62

[56] References Cited
UNITED STATES PATENTS

| 3,068,879 | 12/1962 | Snowman et al. | 137/100X |
| 3,081,786 | 3/1963 | Edwards | 137/101X |

*Primary Examiner*—William F. O'Dea
*Assistant Examiner*—David R. Matthews
*Attorney*—Nathaniel L. Leek ABSTRACT: A valve assembly for use in pipelines including a main valve housing having a valve chamber with opposed inlet and outlet ports. Valve heads in the chamber are advanced toward the respective ports to close the same. Auxiliary valves are disposed in housings between said ports and the downstream and upstream portions of the pipeline to close the pipelines for isolating the main valve housing so as to prevent loss of fluid or of pressure in the lines while the main valve housing is removed for purposes of repair or replacement. All valves are actuated by expandable bellows in response to the pressure of a control fluid.

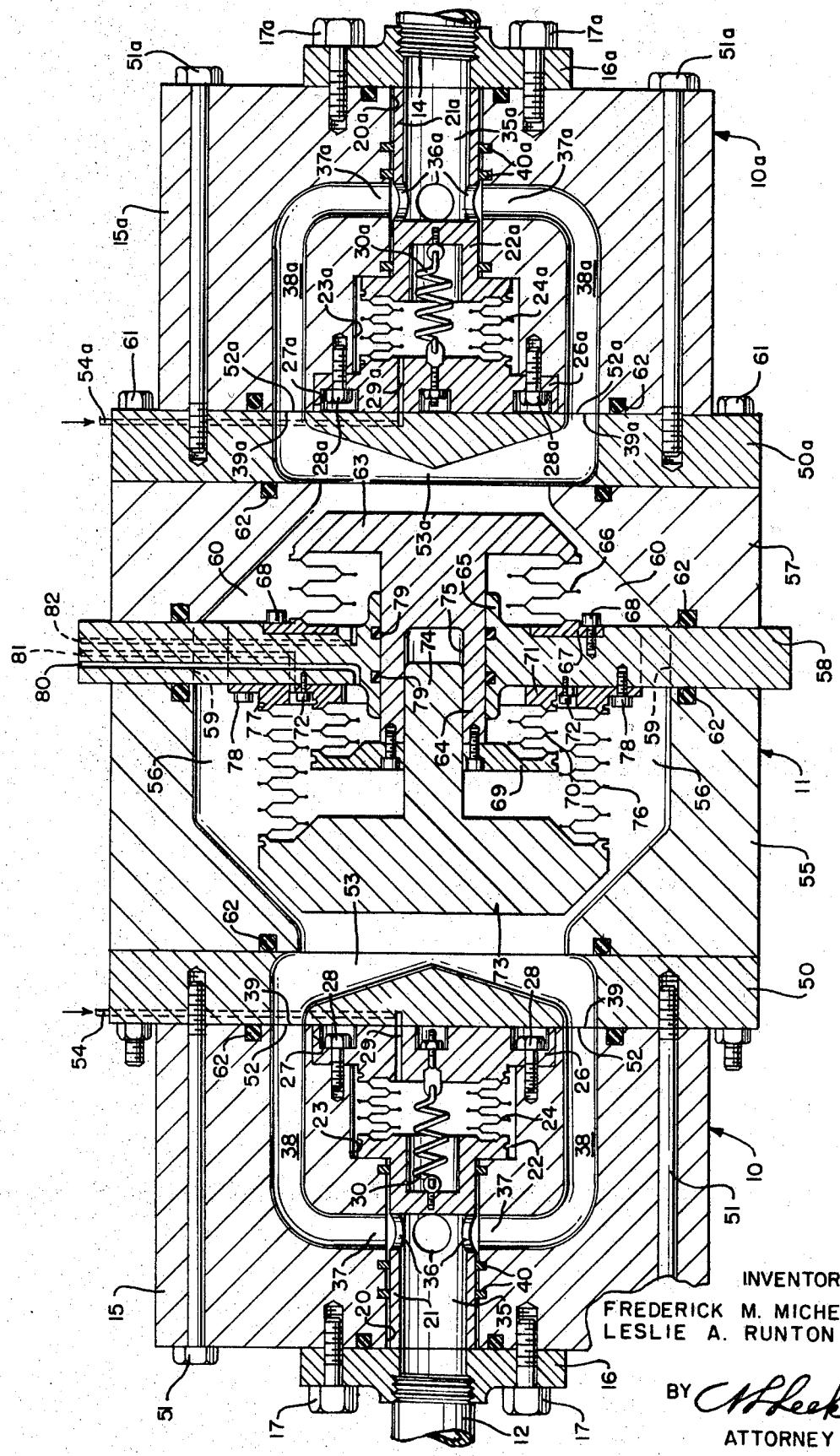
INVENTORS
FREDERICK M. MICHELSON
LESLIE A. RUNTON
ATTORNEY

VALVE SYSTEM

This invention relates to pipe closure valve systems, and more particularly, to a system adapted for use with cryogenic, toxic, corrosive high temperature, or other hazardous fluids.

An object is to provide a system in which the flow of fluids in a pipeline can be interrupted in case of pressure drop, or line breakage, or for other reasons without loss of line pressure or line fluid and without creating a hazardous condition.

Another object is to be able to remove the main control valve in such a system for replacement or repair without loss of line fluid or line pressure.

Another object is to provide a system of the above type wherein there are no exterior moving parts which protrude through the casing and would provide a source for leakage.

Another object is to provide a construction in which the parts can be made of wrought metals of the type having desirable characteristics and which are not readily castable.

Various other objects and advantages will be apparent as the nature of the invention is more fully disclosed.

In one embodiment of the invention, the flow control system includes a main valve assembly containing the main valves for controlling the flow of fluids between a downstream pipeline and an upstream pipeline. Interposed between the main valve assembly and the respective pipelines are a pair of spool valve assemblies.

The spool valves are normally closed but are separately openable either in response to pressure of a control fluid or in response to line pressure according to the connections.

The main valve assembly includes a pair of valve heads individually closable against respective seats, one in the downstream direction and the other in the upstream direction. The various valves are actuated by individual bellows in response to the pressure of a control fluid, or in response to pressure derived from the pipeline.

The spool valves, when closed, permit the main valve assembly to be removed from the system for repair or replacement without loss of line fluid or of line pressure, and the assembly is so constructed that no moving parts extend through the housings to require packings or to serve as a source of leakage of the line fluid.

The nature of the invention will be better understood from the following description, taken in connection with the accompanying drawing in which a specific embodiment has been set forth for purposes of illustration.

In the drawing:

The single FIG. is a longitudinal section through a pipe closure valve system embodying the invention.

Referring to the drawing more in detail, the system is shown as comprising a pair of spool valve assemblies 10 and 10a and a main valve assembly 11 connecting a high-pressure downstream pipeline 12 and a low-pressure upstream pipeline 14.

The spool valve assembly 10 comprises a cylindrical housing 15 bolted to a pipe flange 16 by a circle of bolts 17. The housing 15 has an axial bore 20 of somewhat greater diameter than the inside diameter of the pipeline 12.

A cylindrical spool valve 21 slides in the bore 20 of the housing 15 and is provided with a flange 22 at its inner end riding in an enlarged bore 23 in the housing 15 and carrying one end of a bellows 24 which is disposed within the bore 23 and is attached at its other end to a plate 26 which seats in a recess 27 in the rear face of the housing 15. The plate 26 is secured to the housing 15 by bolts 28 which are recessed below the plane of the rear housing 15.

The plate 26 is provided with a hole 29 communicating with the interior of the bellows 24 for the purpose to be described. A tension spring 30 is anchored between the flange 22 of the spool 21 and the plate 26 to hold the spool in normally retracted position except when the spool is advanced by pressure introduced within the bellows 24 through the hole 29.

The spool 21 is bored out from its forward end by a distance of at least half of its length to form a chamber 35 having a diameter at least equal to the internal diameter of the pipeline 12. A plurality of radially spaced ports 36 are disposed around the spool 21 in communication with the chamber 35 near the inner end thereof. A corresponding set of registering ports 37 communicate through passages 38 with a ring of openings 39 in the rear face of the housing 15. The ports 36 on the spool 21 register with the ports 37 in the housing 15 when the spool is fully advanced by pressure within the bellows 24 and communication is interrupted when the spool is retracted by the spring 30. Sealing rings 40 are disposed on opposite sides of the ports 36 to prevent leakage into and contamination of the space 23 on the outside of the bellows 24. The total area of the ports 36 and 37 and passages 39 should be at least equal to or greater than the area of the pipeline 12 as all of the fluid passes through these ports into the main valve assembly 11.

The spool valve assembly 10a which is attached to the upstream pipeline 14 is identical with the assembly 10 above-described and has been given the same reference characters with the suffix "a."

The main valve assembly 11 comprises an end plate 50 which is disposed against the end face of the spool valve housing 15 and is secured thereto by a ring of bolts 51 extending through the housing 15 outside of the circle of bolts 17. The plate 50 is formed with a ring of transverse opening 52 registering with the ports 39 of the housing 15 and communicating with an annular channel 53 on the inner face of the plate. The plate 50 also contains a passage 54 extending from its periphery to communicate with the hole 29 in the plate 26 for the supply of fluid under pressure to the inside of the bellows 24 for advancing the spool 21 into open position.

A similar plate 50a is attached to the inner face of the spool valve housing 15a and is designated by similar reference characters with the suffix "a."

The main valve assembly 11, on its downstream side, includes cylindrical housing 55 secured against the plate 50 and has an internal valve chamber 56 conforming on the downstream side to the outer diameter of the annular channel 53 in plate 50 and tapering outwardly toward its upstream side at an angle such as 45° to form a valve seat and a fluid chamber for the passage of pipeline fluids.

A similar cylindrical housing 57 on the upstream side is disposed against plate 50a and is separated from the cylindrical housing 55 by a center plate 58 having openings 59 for the passage of the pipeline fluid. The cylindrical housing 57 is formed with a tapered chamber 60 which is similar to the chamber 56 except that its diameter at its upstream side is somewhat smaller, so as to accommodate a smaller valve head.

The main valve housing 11 consisting of the plates 50, 58 and 50a and the cylindrical housings 55 and 57 are secured together by a ring of bolts 61. The various plates and housings are sealed by suitable "0" rings 62 which may be made of metal or of elastermeric materials of a type appropriate for the fluids being handled.

A valve head 63 is adapted to seat inside of the ring 57 for maintaining a closure for the upstream side. The head 63 carries a stem 64 sliding in a hub 65 in the center plate 58. A steel bellows 66 extends between and is attached to the valve head 63 and a ring 67 which is attached to the center plate 58 by bolts 68. On the downstream side of the hub 65, the stem 64 carries a flange 69 to support a bellows 70 which extends between the flange 69 and a supporting ring 71 which is attached to the center plate 58 by bolts 72.

A valve head 73 is adapted to seat against the ring 55 for closing the fluid passage on the downstream side. The valve head 73 carries a stem 74 which slides within a bore 75 in stem 64 of the valve 63. A steel bellows 76 extends between the valve head 73 and a supporting ring 77 which is attached to the center plate 58 by bolts 78.

Stem 64 is sealed within the hub 65 by "0" rings 79.

The center plate 58 contains three passages 80, 81 and 82 which extend respectively from the periphery of the plate 58 into communication with the interiors of bellows 70, 76 and 66 for the supply of actuating fluid thereto.

In normal through flow position, the spool valves 21 and 21a are in open position and the valve heads 73 and 63 are retracted from their respective seats.

The spool valves 21 and 21a are held in open position by the introduction of a control fluid into the bellows 24 and 24a through passages 54 and 54a. When these valves are to be closed, the fluid pressure within the bellows 24 and 24a is reduced to an amount such that the force thereof is overcome by the springs 30 and 30a. The springs then retract the valves to closed position and prevent further discharge of fluid from the pipeline 12 or flow of fluid into the pipeline 14. Hence, there is no possibility of loss of fluid from the system even if the main valve assembly 11 is removed.

In order to provide "fail-safe" conditions, the passages 54 and 54a may be supplied with line pressure by a connection from the high-pressure line 12. Since the area of the flanges 22 and 22a is greater than the inside area of the valves 21 and 21a, the line pressure will serve to maintain the valves in open position. However, should the line pressure drop to a valve such that the pressure on the flanges 22 and 22a is overcome by the springs 30 and 30a the valves will be closed automatically. Hence, any loss of pressure in the line will immediately close the valves 21 and 21a and will prevent any loss of line fluid.

For normal opening and closing of the line 12, the valve heads 73 and 63 are actuated while the spool valves are left in open positions. The valve head 73 is normally held in open position by the pressure of the line fluid which tends to retract the valve head from its seat into the chamber 56.

The valve head 63 is held in open position by fluid pressure supplied to the bellows 70 through passage 80 in the center plate 58.

When the valves are to be closed, fluid pressure in the bellows 70 is released and fluid pressure is supplied to the bellows 66 through passage 82 in the center plate 58. The closing of the valve head 63 serves to equalize the pressure in the valve chambers 56 and 60 which are connected through passages 59 in the plate 58 and, thus, to reduce the pressure drop across the valve head 73 so that the closing of this head is facilitated. Fluid pressure is then supplied to the bellows 76 through the passage 81 in the center plate 58. This causes the valve head 73 to close against its seat and completes the isolation of the pipeline 12 from the pipeline 14.

For opening the valves, the valve head 63 is first opened by reducing the fluid pressure within the bellows 66 and increasing the fluid pressure in the bellows 70.

The opening of the valve head 63 reduces the fluid pressure within the chamber 56 against the rear face of the valve head 73. The fluid pressure within the bellows 76 is then reduced to permit the valve head 73 to open in response to the line pressure acting against the forward face of the valve.

The diameter of the bellows 76 is sufficiently greater than the diameter of the forward face of the valve head 73 to permit the line fluid pressure to be supplied to the bellows 76 for actuating the valve head 73 as above-described. Three separate areas of pressure assist in closing the valve head 63; First, the pressure within the bellows 66 for which line pressure can be used; second, the external pressure of the fluid from pipeline 12 in the chamber 60 acting upon the rear face of the valve head 63; third, the fluid pressure within the bellows 76 acting upon the back of the flange 69 supporting the bellows 70.

Actuating fluid pressure may be supplied to the bellows 70 for retracting the head 63 from the pipeline 12, or from a separate source of control fluid according to requirements.

For removing the main valve assembly 11 for any reason, the spool valves are first closed as described above to isolate pipelines 12 and 14. Then bolts 51 and 51a are removed to release the plates 50 and 50a from their respective spool valve assemblies. The main valve assembly 11 can then be lifted out after removing any bolts 61 whose heads might interfere. The main valve assembly can then be repaired or replaced without any loss of line fluid or of line pressure.

The above system reduces the time required for valve repair or replacement operations as no other valves, either downstream or upstream need to be actuated. It also reduces the cost due to fluid loss and eliminates any danger to persons which could otherwise occur due to escape of dangerous fluids.

I claim:

1. Valve mechanism for use in a pipeline, comprising a housing forming a valve chamber and having oppositely disposed inlet and outlet ports, a tapered valve seat registering with each port and valve heads in said chamber mounted to be advanced independently toward the respective ports for sealing against said valve seats, a transverse plate in said chamber having a closed area in alignment with said heads and having openings therearound for the passage of the line fluid, said heads carrying stems slidable in said plate for guiding said heads as they are shifted between open and closed positions, expandable bellows extending between the closed area of said plate and the respective valve heads, and means supplying a control fluid under pressure to said bellows for advancing the respective heads to closed position.

2. Valve mechanism for use in a pipeline, comprising a housing forming a valve chamber and having oppositely disposed inlet and outlet ports, a tapered valve seat registering with each port and valve heads in said chamber mounted to be advanced toward the respective ports for sealing against said valve seats, a transverse plate in said chamber having openings for the passage of the line fluid, expandable bellows extending between said plate and the respective valve heads, and means supplying a control fluid under pressure to said bellows for advancing said heads to closed position, the valve head on the outlet side carrying a stem extending through and sliding in said plate and a third bellows extending between said plate and the free end of said stem, and means to supply a control fluid under pressure to said last bellows for expanding the same to retract said last head.

3. Valve mechanism as set forth in claim 2 in which said third bellows is disposed within the bellows connected to the head on the inlet side whereby the fluid pressure within said last bellows exerts a valve-closing pressure on said third bellows.

4. A valve assembly comprising a main valve mechanism for use in a pipeline comprising a main valve housing containing a chamber having opposed inlet and outlet ports communicating respectively with the downstream and upstream portions of said pipeline and valve heads in said chamber positioned to close the respective ports, and auxiliary valve housings communicating with said inlet and outlet ports respectively and interposed between said main valve housing and the corresponding portions of the pipeline, normally closed valves in said auxiliary housings, selective means for closing said last valves for isolating the pipeline portions, and means releasably connecting said auxiliary housings to said main housing to permit the main housing to be removed after said last valves have been closed without loss of fluid or of head in said pipeline portions.

5. Valve mechanism as set forth in claim 4 in which said auxiliary valves are spring biased to closed positions, an expandable bellows are connected to open said valves and means is provided to supply a control fluid to said bellows under a pressure adapted to maintain said valves in open position.

6. Valve mechanism as set forth in claim 5 in which line pressure is supplied to said bellows and the bellows have an area sufficiently great to maintain said valves closed against the pressure of the line fluid, whereby the valves automatically close in response to a predetermined drop in line pressure.

7. Valve mechanism as set forth in claim 4 in which said auxiliary valves are of the spool valve type and are slidable to open and close peripheral ports, said auxiliary housings having passages connecting said peripheral ports to the inlet and outlet ports of the main valve housing.

8. Valve mechanism for use in a pipeline, comprising a housing forming a valve chamber and having oppositely disposed inlet and outlet ports, a tapered valve seat registering with each port and valve heads in said chamber mounted to be advanced toward the respective ports for sealing against said valve seats, a transverse plate in said chamber having openings for the passage of the line fluid, expandable bellows extending between said plate and the respective valve heads, and means supplying a control fluid under pressure to said bellows for advancing said heads to closed position, said plate containing passages for said control fluid communicating with the respective bellows.

9. Valve mechanism for use in a pipeline, comprising a housing forming a valve chamber and having oppositely disposed inlet and outlet ports, a tapered valve seat registering with each port and valve heads in said chamber mounted to be advanced toward the respective ports for sealing against said valve seats, a transverse plate in said chamber having openings for the passage of the line fluid, expandable bellows extending between said plate and the respective valve heads, and means supplying a control fluid under pressure to said bellows for advancing said heads to closed position, the head on the inlet side being greater in area than the head on the outlet side and being openable in response to line pressure when the control fluid pressure is reduced.